(12) United States Patent
Taruya et al.

(10) Patent No.: US 8,721,867 B2
(45) Date of Patent: May 13, 2014

(54) METHOD OF SHUTTING DOWN WATER ELECTROLYSIS APPARATUS

(75) Inventors: Kenji Taruya, Utsunomiya (JP); Masanori Okabe, Nerima-ku (JP); Aoi Miyake, Utsunomiya (JP); Jun Takeuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1098 days.

(21) Appl. No.: 12/721,740

(22) Filed: Mar. 11, 2010

(65) Prior Publication Data
US 2010/0230295 A1    Sep. 16, 2010

(30) Foreign Application Priority Data

Mar. 11, 2009 (JP) .................................. 2009-057623
Feb. 10, 2010 (JP) .................................. 2010-027148

(51) Int. Cl.
*C25B 1/10* (2006.01)
*C25B 1/12* (2006.01)
*C25B 1/04* (2006.01)

(52) U.S. Cl.
USPC ....................................................... 205/628

(58) Field of Classification Search
USPC ....................................................... 205/628
See application file for complete search history.

(56) References Cited

U.S. PATENT DOCUMENTS

| | | | |
|---|---|---|---|
| 4,561,949 A | * | 12/1985 | Miles et al. ................... 205/724 |
| 5,766,427 A | * | 6/1998 | Mergel et al. ................. 204/264 |
| 2005/0199509 A1 | * | 9/2005 | Ross ............................. 205/633 |
| 2006/0201800 A1 | * | 9/2006 | Nakazawa et al. ............ 204/280 |
| 2008/0257749 A1 | * | 10/2008 | Bulan et al. ................... 205/350 |

FOREIGN PATENT DOCUMENTS

JP    2006-70322    3/2006

OTHER PUBLICATIONS

C.A. Schug, "Operational Characteristics of High-Pressure, High-Efficiency Water-Hydrogen-Electrolysis" Int. J. Hydrogen Energy 23(12), p. 1113-1120 (1998).*

* cited by examiner

*Primary Examiner* — Bryan D. Ripa
(74) *Attorney, Agent, or Firm* — Nelson Mullins Riley & Scarborough LLP; Anthony A. Laurentano

(57) ABSTRACT

A water electrolysis apparatus applies an electrolysis voltage between current collectors disposed on the respective sides of an electrolyte membrane thereby to electrolyze water to generate oxygen in an anode electrolysis chamber and hydrogen in a cathode electrolysis chamber under a pressure higher than a normal pressure. The water electrolysis apparatus is shut down by applying a voltage between the current collectors after the cathode electrolysis chamber stops supplying the hydrogen, reducing a pressure in at least the cathode electrolysis chamber while the voltage is being applied, and stopping applying the voltage when the pressure in the cathode electrolysis chamber is equal to a pressure in the anode electrolysis chamber.

2 Claims, 12 Drawing Sheets

METHOD OF SHUTTING DOWN WATER ELECTROLYSIS APPARATUS

CROSS-REFERENCE TO RELATED APPLICATION

This application is based upon and claims the benefit of priorities from Japanese Patent Applications No. 2009-057623 filed on Mar. 11, 2009 and No. 2010-027148 filed on Feb. 10, 2010, of which the contents are incorporated herein by reference.

BACKGROUND OF THE INVENTION

1. Field of the Invention

The present invention relates to a method of shutting down a water electrolysis apparatus which applies an electrolysis voltage between current collectors disposed on the respective sides of an electrolyte membrane thereby to electrolyze water to generate oxygen in an anode electrolysis chamber and hydrogen in a cathode electrolysis chamber having a pressure higher than a normal pressure.

2. Description of the Related Art

Solid polymer electrolyte fuel cells generate DC electric energy when anodes thereof are supplied with a fuel gas, i.e., a gas mainly containing hydrogen, e.g., a hydrogen gas, and cathodes thereof are supplied with an oxygen-containing gas, e.g., air.

Generally, water electrolysis apparatus are used to generate a hydrogen gas for use as a fuel gas for such solid polymer electrolyte fuel cells. The water electrolysis apparatus employ a solid polymer electrolyte membrane (ion exchange membrane) for decomposing water to generate hydrogen (and oxygen). Electrode catalyst layers are disposed on the respective sides of the solid polymer electrolyte membrane, making up a membrane electrode assembly. Current collectors are disposed on the respective sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen ion is discharged with excess water from the units.

As such a water electrolysis apparatus, there has been used a high-pressure hydrogen manufacturing apparatus for generating hydrogen under a high pressure which is generally of 1 MPa or higher. For example, a high-pressure hydrogen manufacturing apparatus disclosed in Japanese Laid-Open Patent Publication No. 2006-070322 comprises a solid polymer membrane, cathode current collectors disposed on the respectively opposite sides of the solid polymer membrane in confronting relation to each other, anode current collectors, separators stacked on the current collectors, and flow fields defined in the separators, to which the electrode feeders are exposed. When water is supplied to the flow fields defined in the anode separators and the current collectors are energized, the water is electrolyzed to produce a hydrogen gas under high pressure in the flow fields defined in the cathode separators. The disclosed high-pressure hydrogen manufacturing apparatus includes pressing means for pressing the cathode current collectors into intimate contact with the solid polymer membrane.

When a pressure on the cathode is high, the pressing means presses the cathode current collectors into intimate contact with the solid polymer membrane. Therefore, no clearance is created between the cathode current collectors and the solid polymer membrane, preventing the contact resistance from increasing.

In the above high-pressure hydrogen manufacturing apparatus, the flow fields defined in the cathode separators are filled with the high-pressure hydrogen, and on the other side of the solid polymer membrane, water and oxygen under a normal pressure are present in the flow fields defined in the anode separators. When the high-pressure hydrogen manufacturing apparatus is to be shut down, i.e., when the high-pressure hydrogen manufacturing apparatus is to stop supplying the generated hydrogen, it is necessary to eliminate the pressure difference across the solid polymer membrane in order to protect the solid polymer membrane.

For shutting down the high-pressure hydrogen manufacturing apparatus, it is customary to de-energize the current collectors to stop the water electrolyzing process, and then the pressure of the hydrogen filling the flow fields defined in the cathode separators is forcibly reduced to a level near the normal pressure.

If the pressure of the hydrogen is reduced too rapidly, the solid polymer membrane and seals tend to be unduly damaged. Therefore, the pressure of the hydrogen needs to be reduced slowly. As a consequence, it takes a considerable period of time until the pressure of the hydrogen filling the flow fields defined in the cathode separators reaches the normal pressure after the water electrolyzing process is stopped. During such a long period of time, the hydrogen is liable to pass from the cathode to the anode, causing the anode catalysts to be reduced by the hydrogen to result in deterioration in the water electrolyzing capability.

SUMMARY OF THE INVENTION

It is an object of the present invention to provide a method of shutting down a water electrolysis apparatus so as to prevent high-pressure hydrogen which has leaked toward anodes after the water electrolysis apparatus is shut down from remaining in the water electrolysis apparatus, thereby preventing catalytic electrode layers from deteriorating for an effective water electrolyzing process.

According to the present invention, there is provided a method of shutting down a water electrolysis apparatus which applies an electrolysis voltage between current collectors disposed on the respective sides of an electrolyte membrane thereby to electrolyze water to generate oxygen in an anode electrolysis chamber and hydrogen in a cathode electrolysis chamber under a pressure higher than a normal pressure, comprising the steps of applying a voltage between the current collectors after the cathode electrolysis chamber stops supplying the hydrogen, and reducing a pressure in at least the cathode electrolysis chamber while the voltage is being applied between the current collectors.

According to the present invention, as described above, the pressure in the cathode electrolysis chamber is reduced while the voltage is being applied between the current collectors. When hydrogen in the cathode electrolysis chamber leaks into the anode electrolysis chamber, the hydrogen is protonated again by the applied voltage, and then returned to the cathode electrolysis chamber by a hydrogen pump effect of the electrolyte membrane.

Therefore, after the water electrolysis apparatus is shut down, the high-pressure hydrogen that has leaked into the anode electrolysis chamber is prevented from remaining therein and hence anode catalyst layers are prevented from being reduced (deteriorated) by hydrogen. Thus, it is possible to prevent the electrolyzing efficiency from dropping even if the water electrolysis apparatus is activated and shut down repeatedly, and hence to carry out the water electrolyzing process effectively.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
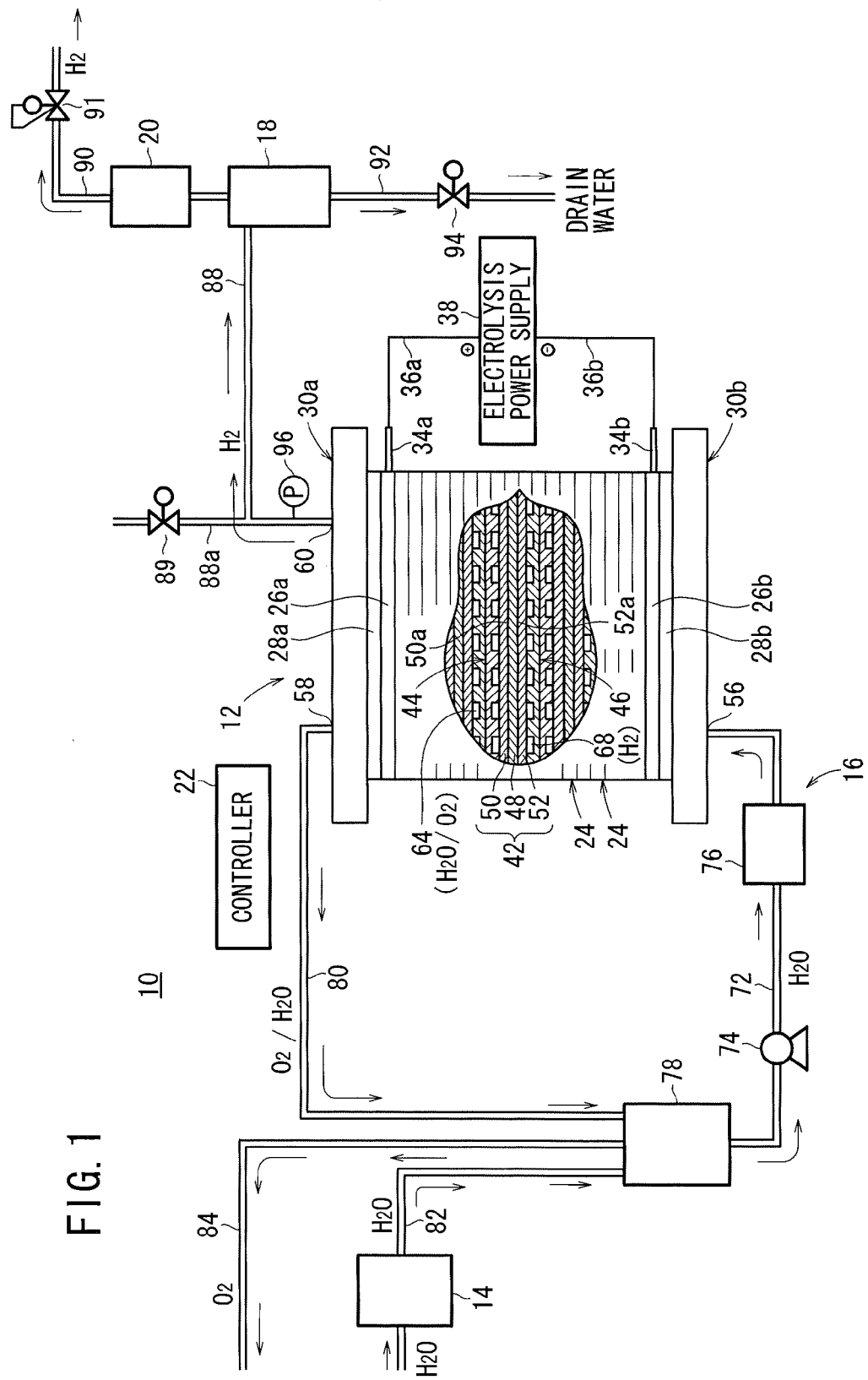
FIG. 1 is a schematic view, partly in block form, of a water electrolysis apparatus to which a method of shutting down a water electrolysis apparatus according to a first embodiment of the present invention is applied.

As shown in FIG. 1, a water electrolysis apparatus 10 to which a method of shutting down a water electrolysis apparatus according to a first embodiment of the present invention is applied comprises a water electrolysis mechanism 12 for electrolyzing pure water to produce high-pressure hydrogen (whose pressure is higher than a normal pressure (atmospheric pressure), e.g., 1 MPa or higher), a water circulating mechanism 16 for supplying the pure water generated from the city water by a pure water supply mechanism 14 to the water electrolysis mechanism 12, and further circulatively supplying excess water discharged from the water electrolysis mechanism 12 to the water electrolysis mechanism 12, a hydrogen-side gas-liquid separator 18 for removing water contained in the high-pressure hydrogen which is delivered from the water electrolysis apparatus 12, a hydrogen dehumidifier 20 for adsorbing and removing water contained in the hydrogen supplied from the hydrogen-side gas-liquid separator 18, and a controller 22.

The water electrolysis mechanism 12 comprises a high-pressure hydrogen manufacturing apparatus (cathode pressure>anode pressure) having a plurality of stacked unit cells 24. The water electrolysis mechanism 12 also includes a terminal plate 26a, an insulating plate 28a, and an end plate 30a which are mounted on an upper end of the stack of unit cells 24 outwardly in the order named, and a terminal plate 26b, an insulating plate 28b, and an end plate 30b which are mounted on a lower end of the stack of unit cells 24 outwardly in the order named. The stack of unit cells 24, the terminal plates 26a, 26b, and the insulating plates 28a, 28b are fastened integrally together between and by the end plates 30a, 30b.

Terminals 34a, 34b project radially outwardly from respective side edges of the terminal plates 26a, 26b. The terminals 34a, 34b are electrically connected to a power supply 38 for electrolysis by electric wires 36a, 36b, respectively. The terminal 34a, which is an anode terminal, is connected to the positive terminal of the electrolysis power supply 38, and the terminal 34b, which is a cathode terminal, is connected to the negative terminal of the electrolysis power supply 38.

Figure 2:
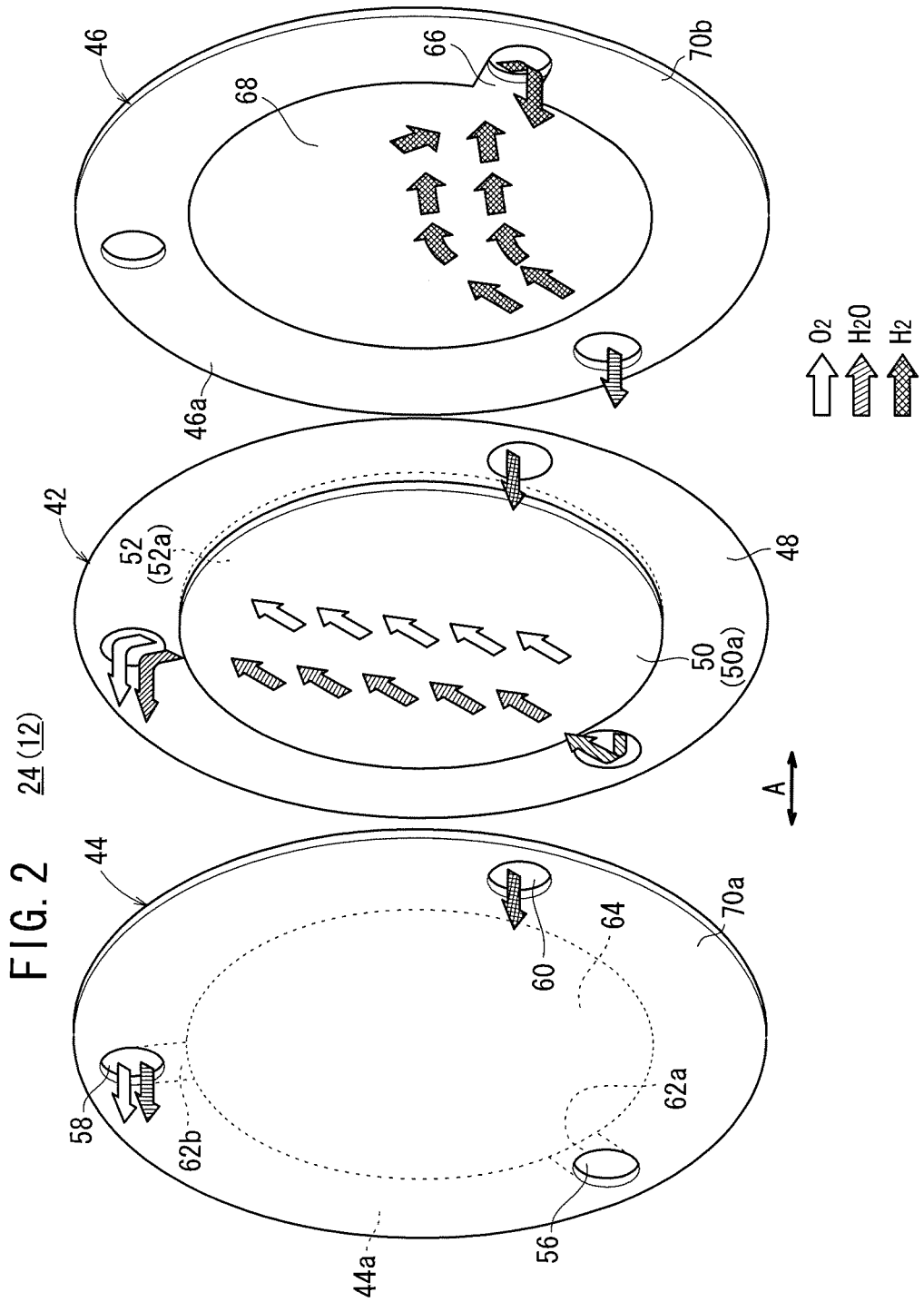
FIG. 2 is an exploded perspective view of a unit cell of the water electrolysis apparatus.

As shown in FIG. 2, each of the unit cells 24 comprises a disk-shaped membrane electrode assembly 42, and an anode separator 44 and a cathode separator 46 which sandwich the membrane electrode assembly 42 therebetween. Each of the anode separator 44 and the cathode separator 46 is of a disk shape and is in the form of a carbon plate, or in the form of a metal plate such as a steel plate, a stainless steel plate, a titanium plate, an aluminum plate, a plated steel plate. Alternatively, each of the separators 44, 46 is formed by press-forming a metal plate having an anti-corrosion-treated surface, or by cutting a metal plate and subjecting its surface to an anti-corrosion treatment.

The membrane electrode assembly 42 has a solid polymer electrolyte membrane 48 comprising a thin membrane of perfluorosulfonic acid which is impregnated with water, and an anode current collector 50 and a cathode current collector 52 which are disposed respectively on the opposite surfaces of the solid polymer electrolyte membrane 48.

An anode catalyst layer 50a and a cathode catalyst layer 52a are formed on the opposite surfaces of the solid polymer electrolyte membrane 38, respectively. The anode catalyst layer 50a is made of an Ru (ruthenium)-based catalyst, for example, and the cathode catalyst layer 52a is made of a platinum catalyst, for example.

Each of the anode current collector 50 and the cathode current collector 52 is made of a sintered spherical atomized titanium powder (porous electrically conductive material), and has a smooth surface area which is etched after it is cut to shape. Each of the anode current collector 50 and the cathode current collector 52 has a porosity in the range of 10% to 50%, or more preferably in the range from 20% to 40%.

Each of the unit cells 24 has, in an outer circumferential edge portion thereof, a water supply passage 56 for supplying water (pure water), a water discharge passage 58 for discharging oxygen generated by a reaction in the unit cells 24 and used water (mixed fluid), and a hydrogen passage 60 for passing therethrough high-pressure hydrogen generated by the reaction. The water supply passage 56 defined in the respective unit cells 24 extends through the stack in the stacking directions indicated by the arrow A. The discharge passage 58 defined in the respective unit cells 24 extends through the stack in the stacking directions indicated by the arrow A. The hydrogen passage 60 defined in the respective unit cells 24 extends through the stack in the stacking directions indicated by the arrow A.

The anode separator 44 has a supply channel 62a held in fluid communication with the water supply passage 56 and a discharge channel 62b held in fluid communication with the water discharge passage 58. The supply channel 62a and the discharge channel 62b are defined in a surface 44a of the anode separator 44 which faces the membrane electrode assembly 42. The anode separator 44 also has a first flow field (anode electrolysis chamber) 64 defined in the surface 44a and held in fluid communication with the supply channel 62a and the discharge channel 62b. The first flow field 64 extends in a range corresponding to the surface area of the anode current collector 50, and comprises a plurality of flow field grooves, a plurality of embossed ridges, or the like.

The cathode separator 46 has a discharge channel 66 held in fluid communication with the hydrogen passage 60. The discharge channel 66 is defined in a surface 46b of the cathode separator 46 which faces the membrane electrode assembly 42. The cathode separator 46 also has, in the surface 46a, a second flow field (cathode electrolysis chamber) 68 and held in fluid communication with the discharge channel 66. The second flow field 68 extends within a range corresponding to the surface area of the cathode current collector 52, and comprises a plurality of flow field grooves, a plurality of embossed ridges, or the like.

Seal members 70a, 70b are integrally combined with respective outer circumferential edge portions of the anode separator 44 and the cathode separator 46. The seal members 70a, 70b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like.

As shown in FIG. 1, the water circulating mechanism 16 has a circulation pipe 72 held in fluid communication with the water supply passage 56 of the water electrolysis mechanism 12. A circulation pump 74, an ion exchanger 76, and an oxygen-side gas-liquid separator 78 are connected to the circulation pipe 72.

The water circulating mechanism 16 includes a return pipe 80 having an end held in fluid communication with an upper portion of the oxygen-side gas-liquid separator 78 and another end held in fluid communication with the discharge passage 58 of the water electrolysis mechanism 12. The oxygen-side gas-liquid separator 78 is also connected to a pure water supply pipe 82 which is connected to the pure water supply mechanism 14 and an oxygen discharge pipe 84 which discharges oxygen that is separated from pure water by the oxygen-side gas-liquid separator 78.

The hydrogen passage 60 of the water electrolysis mechanism 12 is connected to one end of a high-pressure hydrogen pipe 88 and the other end of the high-pressure hydrogen pipe 88 is connected to the hydrogen-side gas-liquid separator 18. A depressurization pipe 88a with a depressurization valve 89 connected thereto is branched from the high-pressure hydrogen pipe 88.

High-pressure hydrogen supplied from the hydrogen passage 60 flows through the high-pressure hydrogen pipe 88 to the hydrogen-side gas-liquid separator 18, which removes water from the high-pressure hydrogen. The high-pressure hydrogen from which water is removed by the hydrogen-side gas-liquid separator 18 is dehumidified by the hydrogen dehumidifier 20, which supplies dry hydrogen to a dry hydrogen pipe 90. A back pressure valve 91 is connected to the dry hydrogen pipe 90 for keeping the hydrogen generated in the hydrogen passage 60 higher in pressure than oxygen generated by the water electrolysis mechanism 12.

A drain pipe 92 with a discharge valve 94 connected thereto is connected to a lower portion of the hydrogen-side gas-liquid separator 18. As necessary, a pressure sensor 96 for detecting the pressure in the second flow field 68, which serves as a cathode electrolysis chamber, is connected to the high-pressure hydrogen pipe 88 near the hydrogen passage 60.

Operation of the water electrolysis apparatus 10 will be described below.

When the water electrolysis apparatus 10 starts to operate, pure water that has been generated from city water by the pure water supply mechanism 14 is supplied to the oxygen-side gas-liquid separator 78 of the water circulating mechanism 16.

When the circulation pump 74 is actuated, the water circulating mechanism 16 supplies the pure water through the circulation pipe 72 to the water supply passage 56 of the water electrolysis mechanism 12. The electrolysis power supply 38 applies an electrolysis voltage between the terminals 34a, 34b projecting from the terminal plates 26a, 26b.

As shown in FIG. 2, in each of the unit cells 24, the water is supplied from the water supply passage 56 into the first flow field 64 of the anode separator 44 and moves along the anode current collector 50.

The water is electrolyzed by the anode catalyst layer 50a, generating hydrogen ions, electrons, and oxygen. The hydrogen ions generated by the anodic reaction move through the solid polymer electrolyte membrane 48 to the cathode catalyst layer 52a where they combine with the electrons to produce hydrogen.

The produced hydrogen flows along the second flow field 68 that is defined between the cathode separator 46 and the cathode current collector 52. The hydrogen is kept under a pressure higher than the pressure in the water supply passage 56, and flows through the hydrogen passage 60. Thus, the hydrogen is extracted from the water electrolysis mechanism 12.

The oxygen generated by the anodic reaction and the water that has been used flow in the first flow field 64 and then flow through the water discharge passage 58, from which the mixture of oxygen and used water is discharged into the return pipe 80 of the water circulating mechanism 16 (see FIG. 1). The oxygen and the used water are introduced into the oxygen-side gas-liquid separator 78 and separated from each other thereby. The water is delivered by the circulation pump 74 to flow through the circulation pipe 72 and the ion exchanger 76 into the water supply passage 56. The oxygen separated from the water is discharged out of the water electrolysis apparatus 10 through the oxygen discharge pipe 84.

The hydrogen generated in the water electrolysis mechanism 12 is delivered through the high-pressure hydrogen pipe 88 to the hydrogen-side gas-liquid separator 18. The hydrogen-side gas-liquid separator 18 separates water vapor contained in the hydrogen. The hydrogen is then dehumidified by the hydrogen dehumidifier 20. When the pressure of the hydrogen reaches the pressure level set by the back pressure valve 91, the hydrogen is introduced as dry hydrogen into the dry hydrogen pipe 90. The dry hydrogen is then supplied to a fuel cell vehicle, not shown.

Figure 3:
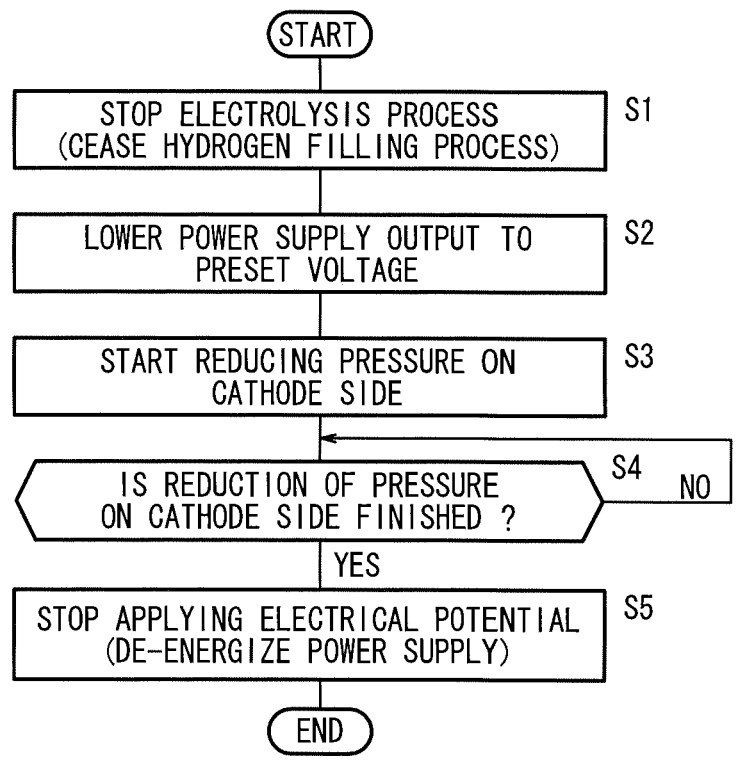
FIG. 3 is a flowchart of the method of shutting down the water electrolysis apparatus according to the first embodiment of the present invention.

The method of shutting down the water electrolysis apparatus 10 according to the first embodiment of the present invention will be described below with reference to FIG. 3.

When the non-illustrated fuel cell vehicle is filled up with the dry hydrogen, the controller 22 judges that the water electrolysis apparatus 10 stops its electrolyzing process in step S1. The controller 22 may judge that the water electrolysis apparatus 10 stops its electrolyzing process based on turning-off of a switch, not shown, or in any of various other ways.

Figure 4:
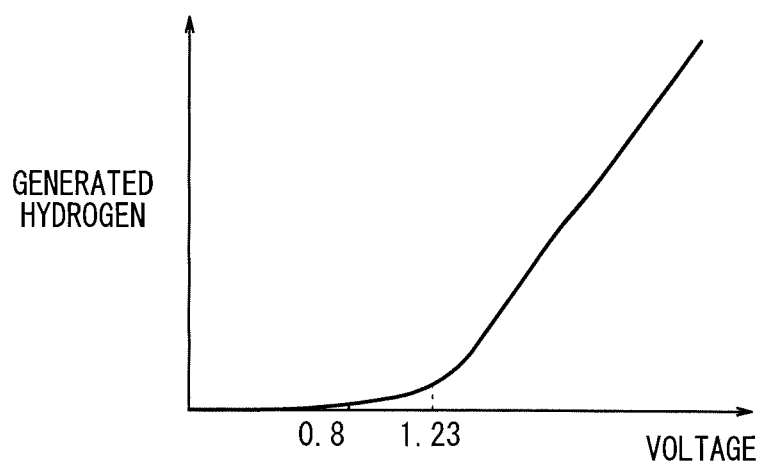
FIG. 4 is a graph showing the relationship between an applied voltage and an amount of generated hydrogen.

Then, in step S2, the power supply 38 for electrolysis applies a preset voltage lower than the electrolysis voltage referred to above between the terminals 34a, 34b. The preset voltage is in the range from 0.2 V to 0.8 V or more preferably from 0.2 V to 0.5 V. If the preset voltage is lower than 0.2 V, then the anode catalyst layer 50a is reduced and deteriorated. If the preset voltage is higher than 0.8 V, or particularly 1.23 V as shown in FIG. 4, then electrolysis of the water progresses, generating a large amount of hydrogen. Therefore, the preset voltage should be equal to or lower than a hydrogen generating voltage. However, even if hydrogen is generated, it has an effect to prevent catalyst deterioration.

The controller 22 controls the electrolysis power supply 38 to apply a preset voltage, e.g., 0.5 V or lower, across each of the unit cells 24 of the water electrolysis mechanism 12. Then, the high-pressure hydrogen on the cathodes starts to be reduced in pressure in step S3.

Specifically, the controller 22 opens the depressurization valve 89 to bring the depressurization pipe 88a into fluid communication with the hydrogen passage 60. The high-pressure hydrogen which fills the second flow fields 68 serving as the cathode electrolysis chambers is gradually reduced in pressure depending on the opening adjustment of the depressurization valve 89.

When the pressure of the hydrogen in the second flow fields 68 becomes equal to the pressure (normal pressure) in the first flow fields 64 ("YES" in step S4), the controller 22 judges that the process of reducing the pressure in the second flow field 68 is finished, and controls the electrolysis power supply 38 to stop applying the preset voltage in step S5. The water electrolysis apparatus 10 is now shut down.

The controller 22 determines whether the pressure of the hydrogen in the second flow fields 68 becomes equal to the pressure in the first flow fields 64 or not, based on the pressure detected by the pressure sensor 96, for example. Alternatively, instead of using the pressure sensor 96, the controller 22 may measure the time that has elapsed from the start of the process of reducing the pressure of the high-pressure hydrogen, and may determine whether the pressure of the hydrogen in the second flow fields 68 becomes equal to the pressure in the first flow fields 64 or not based on whether a given period of time has elapsed or not.

Figure 5:
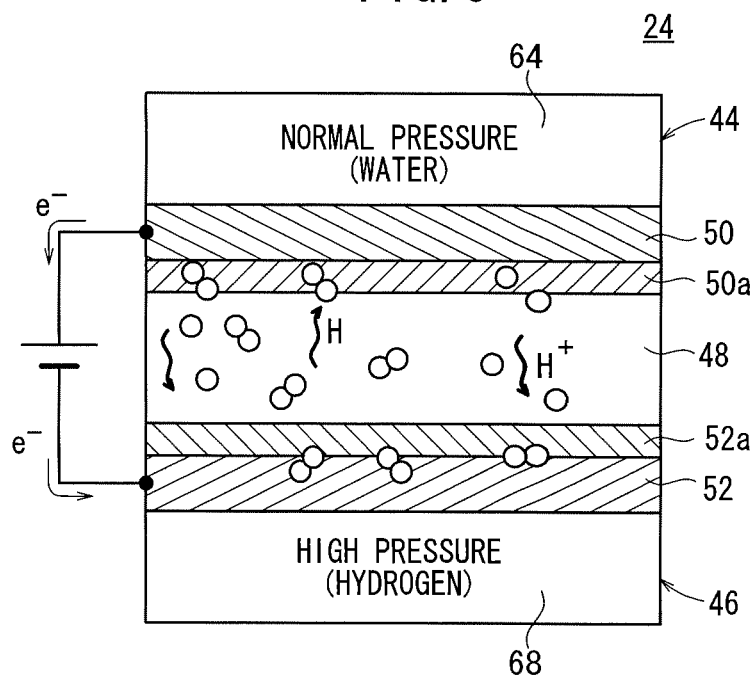
FIG. 5 is a view showing the behavior of hydrogen in the method of shutting down the water electrolysis apparatus.

According to the first embodiment, the controller 22 controls the electrolysis power supply 38 to apply a voltage lower than the electrolysis voltage, and at the same time reduces the pressure in the second flow fields 68 which serve as the cathode electrolysis chambers. Therefore, as shown in FIG. 5, hydrogen easily moves through the solid polymer electrolyte membrane 48 from the second flow field 68 under the high pressure to the first flow field 64 under the normal pressure.

At this time, a small potential in the range from 0.2 V to 0.8 V or more preferably from 0.2 V to 0.5 V is applied across each of the unit cells 24. Consequently, the hydrogen that has leaked into anode catalyst layer 50a is protonated again and then returned to the cathode catalyst layer 52a by a hydrogen pump effect of the solid polymer electrolyte membrane 48. Thereafter, after the water electrolysis apparatus 10 is shut down, the high-pressure hydrogen that has leaked into the anode catalyst layer 50a is prevented from remaining therein and hence the anode catalyst layer 50a is prevented from being reduced (deteriorated) by hydrogen.

Figure 6:
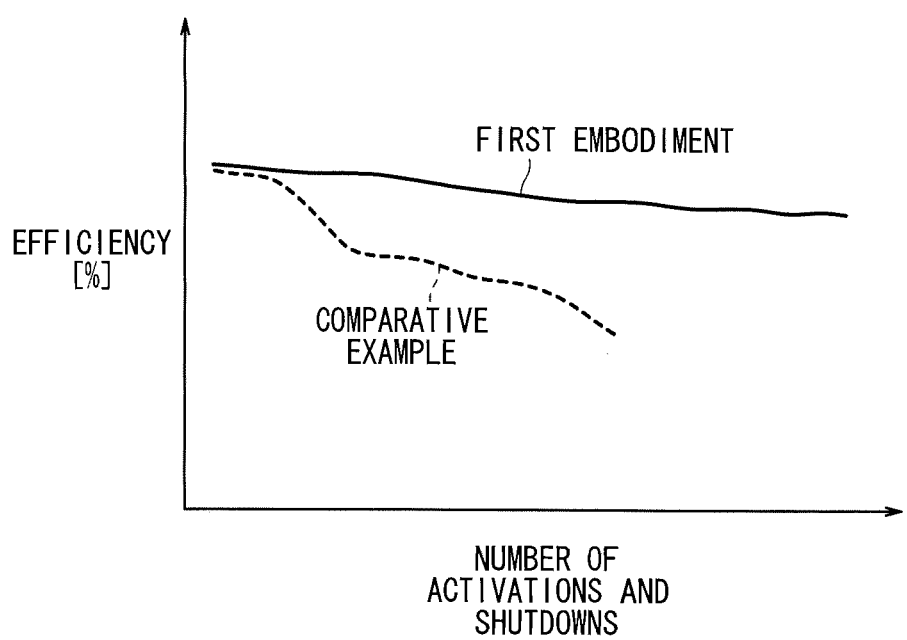
FIG. 6 is a graph showing the relationship between the number of times that the water electrolysis apparatus is activated and shut down and an electrolyzing efficiency according to the first embodiment of the present invention and a comparative example.
Figure 7:
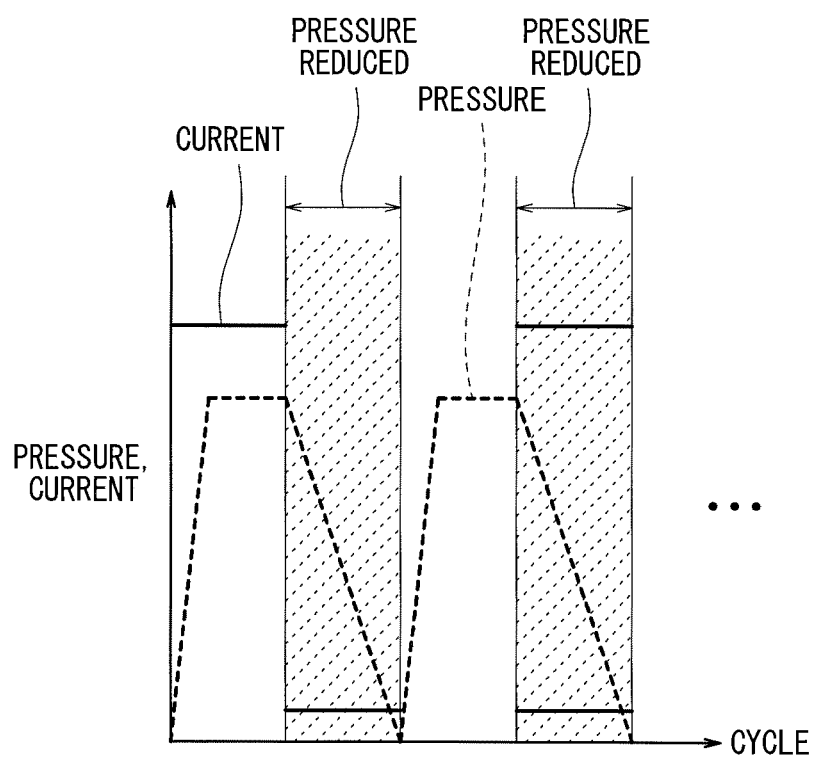
FIG. 7 is a graph showing cycles in which the water electrolysis apparatus is activated and shut down according to the first embodiment of the present invention.

According to the first embodiment, the small potential is applied when the pressure in the second flow fields 68 is reduced. According to a comparative example, no potential was applied when the pressure in the second flow fields 68 was reduced. As shown in FIG. 6, the first embodiment and the comparative example have different electrolyzing efficiencies (durabilities) when the water electrolysis apparatus is activated and shut down repeatedly. Specifically, according to the first embodiment, as shown in FIG. 7, since the small potential is applied to cause a current to flow when the pressure in the second flow fields 68 is reduced, the electrolyzing efficiency drops by about 1% in 10 cycles, for example. According to the comparative example, the electrolyzing efficiency drops by about 5% in 10 cycles.

According to the first embodiment, therefore, it is possible to prevent the electrolyzing efficiency from dropping when the water electrolysis apparatus is activated and shut down repeatedly, and hence the water electrolyzing process is carried out effectively to prevent the entire system efficiency from dropping.

Figure 8:
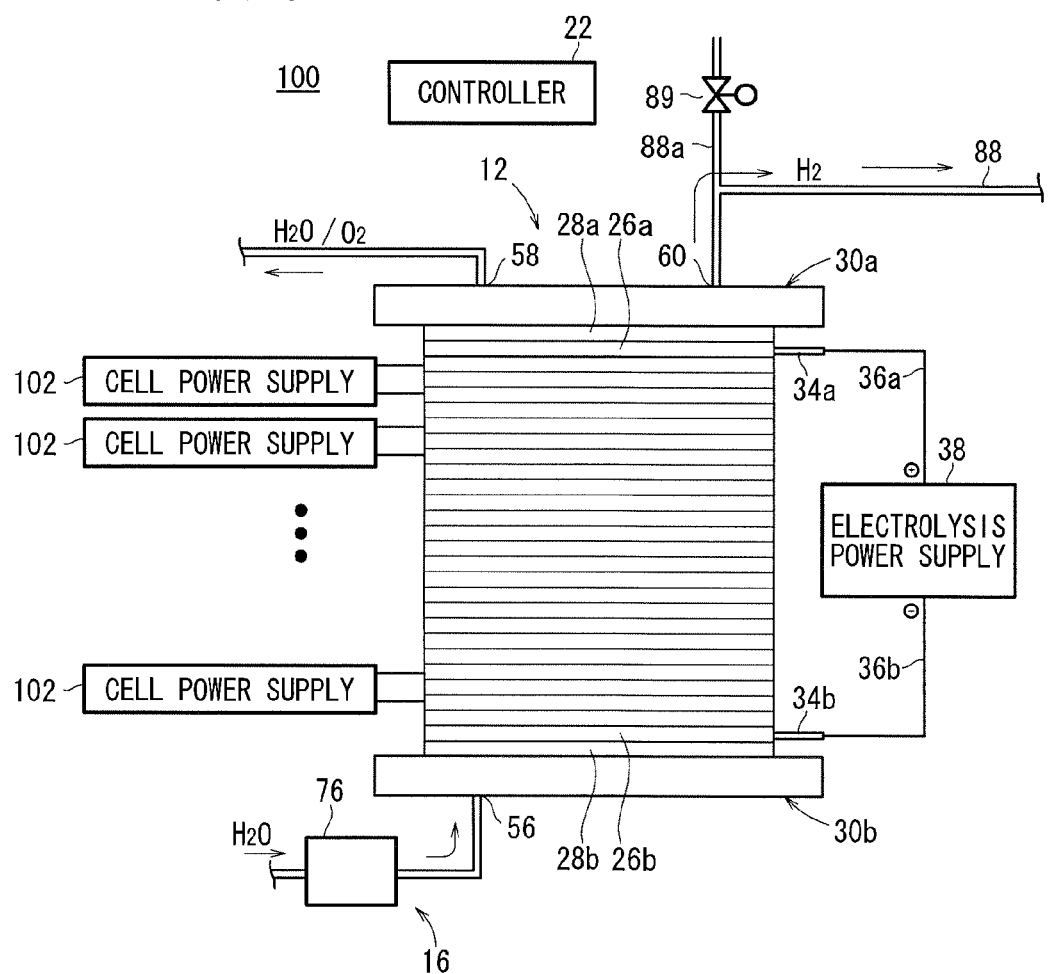
FIG. 8 is a schematic view, partly in block form, of a water electrolysis apparatus according to a second embodiment of the present invention.

FIG. 8 is a schematic view, partly in block form, of a water electrolysis apparatus 100 according to a second embodiment of the present invention.

Those parts of the water electrolysis apparatus 100 which are identical to those of the water electrolysis apparatus 10 shown in FIG. 1 are denoted by identical reference characters, and will not be described in detail below.

As shown in FIG. 8, the water electrolysis apparatus 100 has a water electrolysis mechanism 12 including an electrolysis power supply 38 and also a plurality of cell power supplies 102 for applying a voltage to the respective unit cells 24.

Figure 9:
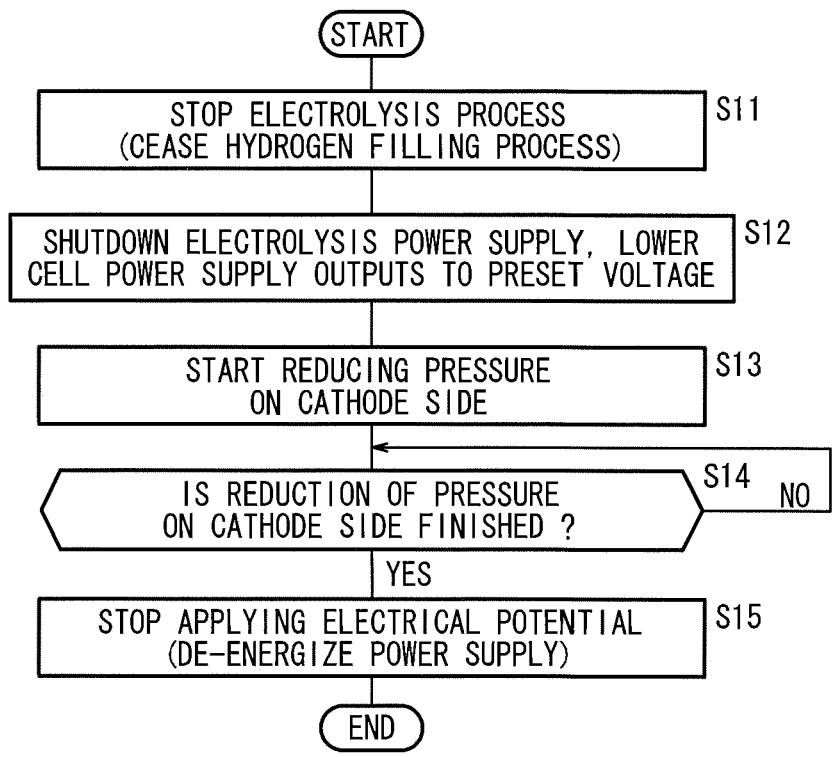
FIG. 9 is a flowchart of a method of shutting down the water electrolysis apparatus according to the second embodiment of the present invention.

A method of shutting down the water electrolysis apparatus 100 according to the second embodiment of the present invention is carried out according to a flowchart shown in FIG. 9. Those steps of the method of shutting down the water electrolysis apparatus 100 according to the second embodiment which are identical to those of the method of shutting down the water electrolysis apparatus 10 according to the first embodiment will not be described in detail below.

When the water electrolysis apparatus 100 stops its electrolyzing process in step S11, the controller 22 shuts down the electrolysis power supply 38 in step S12 and controls the cell power supplies 102 to apply the preset voltage, e.g., 0.5 V or lower, to the respective unit cells 24.

While the low voltage is being applied to the unit cells 24 by the cell power supplies 102, the depressurization valve 89 is opened to start the process of reducing the pressure of the high-pressure hydrogen in the second flow field 68 in step S13.

When the pressure in the second flow field 68 becomes equal to the pressure in the first flow field 64 ("YES" in step S14), the controller 22 judges that the process of reducing the pressure in the second flow field 68 is finished, and controls the cell power supplies 102 to stop applying the preset voltage in step S15.

According to the second embodiment, the pressure in the second flow field 68 is reduced while the preset voltage is being applied to the unit cells 24 by the cell power supplies 102. The second embodiment thus provides the same advantages as the first embodiment.

Figure 10:
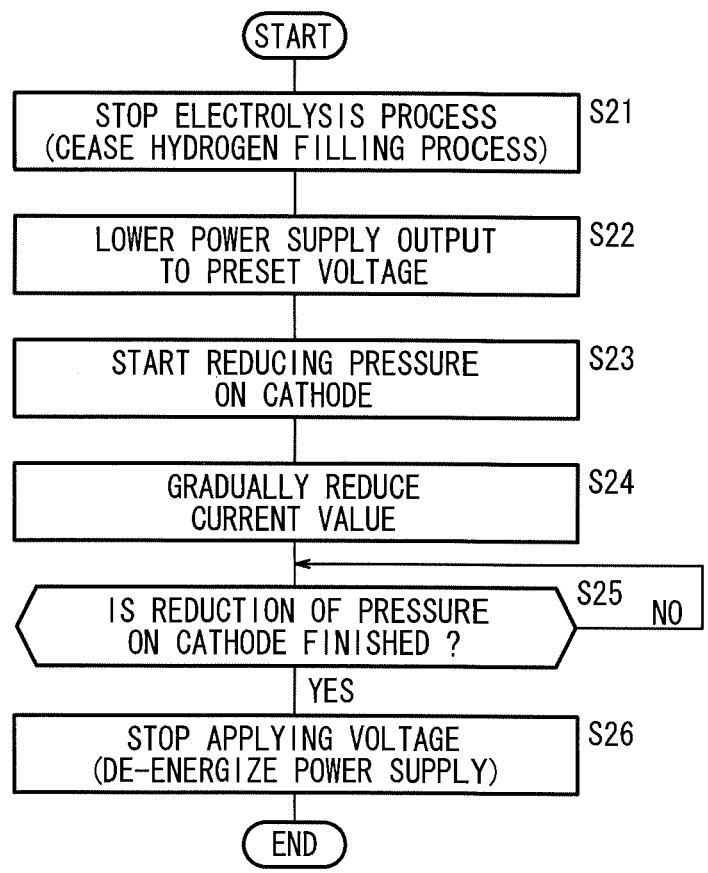
FIG. 10 is a flowchart of a method of shutting down a water electrolysis apparatus according to a third embodiment of the present invention.

FIG. 10 is a flowchart of a method of shutting down a water electrolysis apparatus according to a third embodiment of the present invention. The method according to the third embodiment shuts down the water electrolysis apparatus 10 according to the first embodiment. However, the method according to the third embodiment may shut down the water electrolysis apparatus 100 according to the second embodiment.

According to the third embodiment, after steps S21 through S23 are carried out in the same manner as steps S1 through S3 according to the first embodiment, control goes to step S24.

Figure 11:
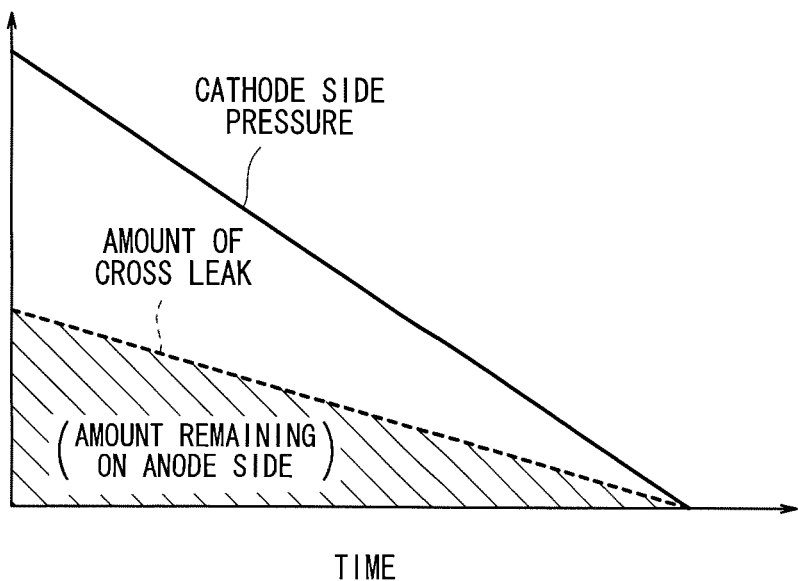
FIG. 11 is a graph showing the relationship between the pressure in a second flow field and the amount of hydrogen cross leak into a first flow field.
Figure 12:
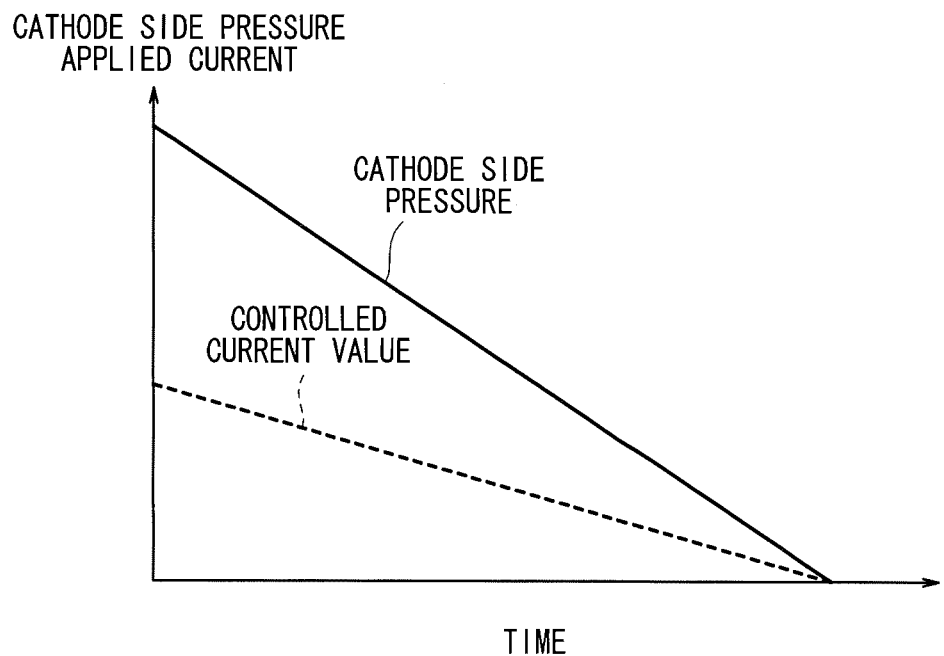
FIG. 12 is a graph showing the relationship between the pressure in a second flow field and the controlled value of a current.

The pressure in the second flow field 68 and the amount of hydrogen cross leak into the first flow field 64 are related to each other as shown in FIG. 11. As shown in FIG. 11, the amount of hydrogen cross leak into the first flow field 64 is reduced as the pressure in the second flow field 68 is lowered. According to the third embodiment, as shown in FIG. 12, as the pressure in the second flow field 68 is lowered, an applied current is controlled to gradually reduce the applied voltage in step S24. Thereafter, control goes to steps S25, S26 which are the same as steps S4, S5 shown in FIG. 3.

According to the third embodiment, since the applied voltage is controlled depending on the amount of hydrogen cross leak into the first flow field 64, the pressure in the second flow field 68 can be reduced more efficiently and effectively. In addition, the third embodiment provides the same advantages as the first embodiment.

In the first through third embodiment, the process of reducing the pressure in the second flow field 68 has been described. However, the present invention is not limited to the process of reducing the pressure in the second flow field 68. If both the pressures in the first and second flow fields 64, 68 are high, the pressure in the first flow field 64 is also reduced.

Although certain preferred embodiments of the present invention have been shown and described in detail, it should be understood that various changes and modifications may be made therein without departing from the scope of the appended claims.

What is claimed is:

1. A method of shutting down a water electrolysis apparatus which applies an electrolysis voltage between current collectors disposed on the respective sides of an electrolyte membrane thereby to electrolyze water to generate oxygen in an anode electrolysis chamber and hydrogen in a cathode electrolysis chamber under a pressure higher than atmospheric pressure, comprising the steps of:

applying a voltage, which is lower than the electrolysis voltage, between the current collectors after the cathode electrolysis chamber stops supplying the hydrogen;

reducing a pressure in at least the cathode electrolysis chamber while the voltage is being applied between the current rent collectors to return hydrogen that has leaked into the anode electrolysis chamber, to the cathode electrolysis chamber; and lowering the voltage applied as the pressure in at least the cathode electrolysis chamber is lowered, wherein the voltage applied is lowered depending on an amount of hydrogen cross leak from the cathode electrolysis chamber into the anode electrolysis chamber.

2. A method according to claim 1, further comprising the step of stopping applying the voltage when the pressure in the cathode electrolysis chamber is equal to a pressure in the anode electrolysis chamber.

* * * * *